United States Patent [19]
Abdou-Sabet

[11] Patent Number: 6,100,334
[45] Date of Patent: Aug. 8, 2000

[54] THERMOPLASTIC VULCANIZATES FROM A CYCLIC OLEFIN RUBBER, A POLYOLEFIN, AND A COMPATIBLIZER

[75] Inventor: Sabet Abdou-Sabet, Akron, Ohio

[73] Assignee: Advanced Elastomer Systems, L.P., Akron, Ohio

[21] Appl. No.: 09/225,425

[22] Filed: Jan. 5, 1999

[51] Int. Cl.⁷ .......................................... C08F 8/00
[52] U.S. Cl. .................. 525/191; 525/210; 525/211; 525/232; 525/240; 525/241
[58] Field of Search ................................. 525/191, 210, 525/211, 232, 240, 241

[56] References Cited

U.S. PATENT DOCUMENTS 4,130,534 12/1978 Coran et al. .
5,073,597 12/1991 Puydak et al. .
5,290,886 3/1994 Ellul .
5,621,045 4/1997 Patel et al. .............................. 525/237
5,763,532 6/1998 Harrington et al. .

*Primary Examiner*—Nathan M. Nutter
*Attorney, Agent, or Firm*—Samuel B. Laferty; William A. Skinner

[57] ABSTRACT

A blend of a semicrystalline polyolefin, a rubbery polymer containing repeat units from norbornene, and a polymeric compatibilizer is disclosed. This composition has reduced oil swell as compared to thermoplastic vulcanizates from a semicrystalline polyolefin and hydrocarbon rubbers.

15 Claims, No Drawings

THERMOPLASTIC VULCANIZATES FROM A CYCLIC OLEFIN RUBBER, A POLYOLEFIN, AND A COMPATIBLIZER

FIELD OF INVENTION

This invention relates to a thermoplastic vulcanizate from a semicrystalline polyolefin, a rubbery polymer including repeat units from a cyclic olefin, and a compatabilizing agent for the polyolefin and the rubbery polymer. The rubbery polymer having repeat units from a cyclic olefin includes repeat units from a poly($\alpha$-olefin), a cyclic olefin such as norbornene, and from a diene monomer such as ethylene norbornene. The thermoplastic vulcanizates have enhanced resistance to swelling with hydrocarbon oils due to the presence of the cyclic olefin and are generally useful for molded or extruded plastic articles requiring impact strength or elasticity.

BACKGROUND OF INVENTION

Thermoplastic vulcanizates from a polyolefin and either EPDM rubber or butyl rubber are commercially available. These compositions are very desirable due to their ability to be processed in conventional thermoplastic shaping and forming equipment while still exhibiting some of the properties of crosslinked rubbers. The hardness (e.g., Shore A/D or 100 percent modulus) can be adjusted by varying the ratio of thermoplastic polyolefin to rubber. Achieving desirable physical properties in a thermoplastic vulcanizate are at least partially dependent upon achieving a suitable dispersion or interdispersion of the polyolefin with the rubber. The correlation between physical properties and dispersibility has limited thermoplastic vulcanizates to two or more polymers that inherently have or can be modified to have dispersibility or interdispersibility of a suitable nature. Thermoplastic vulcanizates from a poly($\alpha$-olefin) and EPDM or butyl rubber, being hydrocarbon-based, swell in hydrocarbon oils. This has excluded their use in some applications where extensive exposure to hydrocarbon oils occurs.

Blends of polypropylene with elastic copolymers of alpha-olefin/cyclic olefin are described in U.S. Pat. Nos. 5,723,545 and 5,763,532. These applications claim priority from the same U.S. application as does WO 94/7113.

SUMMARY OF INVENTION

Polymer blends including thermoplastic vulcanizates from a rubbery polymer (optionally crosslinked) comprising repeat units from at least one $\alpha$-olefin monomer, repeat units from at least one norbornene monomer, and at least one diene monomer have been blended with thermoplastic poly ($\alpha$-olefin) polymers resulting in a good dispersion and good physical properties. The physical properties include good resistance to swelling in hydrocarbon oils which is a desirable property for seals and gaskets exposed to lubricating and power transfer fluids. At higher norbornene content a compatibilizer was found to enhance the compatibility between the thermoplastic poly($\alpha$-olefin) and the rubbery polymer. The norbornene based repeat units in the rubbery polymer keep the $\alpha$-olefin repeat units from crystallizing to an extent wherein the polymer would be a thermoplastic. The repeat units from norbornene in the copolymer also reduce swelling in aliphatic hydrocarbon oils. The norbornene repeat units do not significantly increase swelling in polar solvents such as water, glycols, etc., as would polar repeat units. The diene-based repeat units in the rubbery polymer allow it to be crosslinked with conventional crosslinkers for diene-based elastomers such as phenolic resins, sulfur, peroxides, hydrosilylation, and sulfur-based accelerators.

While increasing the norbornene content of the rubbery polymer helps increase resistance to swelling in hydrocarbon oils, it may under some circumstances decrease the interaction with the polyolefin thermoplastic resulting in a less than optimal dispersion of the rubbery polymer in the polyolefin. Increases in the 100 percent modulus, elongation at break, or ultimate tensile strength have been achieved by adding a compatibilizing polymer (polymeric compatibilizer). Preferred compatibilizing polymers are ethylene-propylene rubber (EPR) or ethylene-propylene diene rubber (EPDM), and hydrogenated block copolymers from a conjugated diene and another monomer such as styrene. Examples of such polymers are the commercial Kraton™ polymers such as SEPS (styrene-ethylene-propylene) and SEBS (styrene-ethylene-butylene). The ethylene-propylene diene rubber, since it can crosslink into the rubbery polymer phase, typically imparts lower compression set to the thermoplastic vulcanizate.

A variety of oils can be added to the thermoplastic vulcanizate either before or after it is crosslinked. Due to the presence of repeat units derived from norbornene in the rubbery polymer, the rubbery polymer interacts well and is plasticized well by aromatic and naphthenic oils. Paraffinic oils may be used alone or in combination with the aromatic or naphthenic oils. Certain low molecular weight ester plasticizers described in U.S. Pat. No. 5,290,886 also are effective plasticizers.

DETAILED DESCRIPTION

A semicrystalline olefin polymer is the first component to the thermoplastic vulcanizate. This is a thermoplastic polymer. Desirably it is a poly($\alpha$-olefin) prepared from the polymerization of monoolefin monomers by high pressure, low pressure, or intermediate pressure process; or by Ziegler catalysts or by metallocene catalysts. Desirably the monoolefin monomer, which is converted to repeat units, are at least 95 weight percent monoolefins of the formula $CH_2=C(CH_3)-R$ or $CH_2CHR$ where R is H or a linear or a branched alkyl group of from 1 to 12 carbon atoms. Preferred semicrystalline polyolefins are polyethylene, polypropylene, or their copolymers, or mixtures thereof. Polyethylene can be high density, low density, linear low density or very low density. The polypropylene can be a homopolymer (isotactic or syndiotractic) as well as a reactor copolymer polypropylene. As these are thermoplastic semicrystalline polymers, they exclude ethylene-propylene copolymers which due to the randomness of the copolymerization behave as rubbers rather than plastics. Desirably the semicrystalline olefin polymer has at least 20 and more preferably at least 30, 35, 40, or 45 weight percent crystallinity as received from the manufacturer. The weight percent crystallinity can be calculated by dividing the heat of fusion of a polyolefin by the heat of fusion of a 100% crystalline version of that polyolefin. The heat of fusion of 100% crystalline polypropylene will be estimated as 209 joules/gram.

The rubbery polymer is primarily a polymer having repeat units from three different groups of monomers. The first monomer group is the norbornene type monomers of the formula

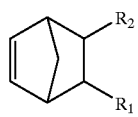

so that it includes norbornene, alkyl or dialkyl substituted norbornene, where the $R_1$ and $R_2$ groups are individually hydrogen or an alkyl of 1 to 8 carbon atoms, and more desirably, hydrogen or an alkyl of 1 to 4 carbon atoms. For the purpose of this application, alkyl or dialkyl substituted norbornene will exclude alkene substituted norbornenes such as methylene norbornene, ethylidene norbornene, etc., which will be termed a diene or polyene. The second group of monomers is α-olefins having from about 2 to about 12 carbon atoms. These are monoolefins so that after they are incorporated into the polymer they are generally free of residual unsaturation. Preferred α-olefin monomers are ethylene and propylene. The third group of monomers is dienes or polyenes, desirably nonconjugated, having from about 5 to about 20 carbon atoms. One or more monomers from each group (at least one monomer from each group) are desirable. Desirably repeat units from the norbornene type monomers are from about 8 to about 20 or 28 mole percent of the resulting polymer and more desirably from about 8 to about 20 mole percent. Desirably, the repeat units from the at least one α-olefin are from about 62 to about 91 mole percent of the resulting polymer and more desirably from about 72 to about 90 mole percent. Desirably the repeat units from at least one diene is from about I to about 10 mole percent and more desirably from about 1 or 2 to about 8 mole percent of the resulting polymer. Examples of these dienes include 1,4-hexadiene, dicyclopentadiene, methylene norbornene, vinyl norbornene, and ethylidene norbornene. The rubbery polymers are prepared in solution processes using catalysts such as vanadium tetrachloride/aluminum sesquichloride catalyst. Other processes or catalyst can be used to generate the same rubbery polymers.

A major portion of the polymers in the polymer blend is the semicrystalline polyolefin and the rubbery polymer. Minor amounts of compatibilizer or other polymers are added to modify flow properties. Other additives such as fillers, diluents, process oils, plasticizers, polymeric antioxidants, and curatives may be added. The amount of other components to the blend will be specified as (1) per 100 parts by weight of the blend and the semicrystalline polyolefin, rubbery polymer, and compatibilizer, or (2) per 100 parts by weight of the rubber.

The semicrystalline polyolefin is desirably from about 10 or 15 to about 75 or 85 parts by weight, more desirably from 25 to about 75 parts by weight, and preferably from about 25 to about 50 parts by weight per 100 parts by weight of the blend of the semicrystalline polyolefin, rubbery polymer, and compatibilizer. The rubbery polymer is desirably from about 24 to about 85 parts by weight, more desirably from about 24 to about 75, and preferably from about 48 or 49 to about 75 parts by weight per 100 parts by weight of said blend. The compatibilizer is desirably from about 1 to about 40 and more desirably from about 1, 2, or 5 to about 25 parts by weight per 100 parts by weight of the blend.

If the amount of semicrystalline polyolefin is based upon the amount of rubbery polymer, it is desirably from about 17.5 to about 300 parts by weight, more desirably from about 33 to about 300 parts by weight, and preferably from about 33 to about 200 parts by weight per 100 parts by weight of the rubbery polymer. The terms "blend," "thermoplastic elastomer," and "thermoplastic vulcanizate" used herein refer to a mixture range of small particles of a rubbery polymer (optionally crosslinked while dispersed) in the thermoplastic matrix to cocontinuous phases of the semicrystalline polyolefin and a rubbery polymer or combinations thereof. While the term "thermoplastic elastomer" can include block copolymers that do not need vulcanization, the term "thermoplastic vulcanizate" is limited to where the rubbery polymer phase is at least partially vulcanized (crosslinked).

The term "thermoplastic vulcanizate" refers to compositions that possess properties of a thermoset elastomer and are reprocessable in thermoplastic equipment. Upon reaching temperatures of above the softening points or melting point of the semicrystalline polyolefin phase, they can form continuous sheets and/or molded articles with relatively complete knitting or fusion of the thermoplastic vulcanizate under conventional molding or shaping conditions for thermoplastics.

If full vulcanization of the rubber phase is desired, desirably less than 5 weight percent or more desirably less than 3 weight percent of the unsaturated rubbers of a specimen of the thermoplastic vulcanizate are extractable in boiling xylene. Techniques for determining extractible rubber are set forth in U.S. Pat. No. 4,311,628 herein incorporated by reference. Vulcanization as used herein is not limited to phenolic type crosslinking and may be accomplished with a variety of crosslinking agents (curatives as set forth hereinbelow).

The polymer blends and thermoplastic vulcanizates of this disclosure are generally prepared by melt-mixing the semicrystalline polyolefin, compatibilizer, and rubbery polymer and optionally the other ingredients (filler, plasticizer, lubricant, stabilizer, etc.) in a mixer to above the melting temperature of the semicrystalline polyolefin. The optional fillers, plasticizers, additives, etc., can be added at this stage or at a later stage. After sufficient molten-state mixing to form a well-mixed blend, the curatives (crosslinking or vulcanizing agents) are generally added. In some embodiments it is preferred to add the vulcanizing agent in solution with a liquid, for example oil, which is compatible with the other components. It is convenient to follow the progress or vulcanization by monitoring mixing torque or mixing energy requirements during mixing. The mixing torque or mixing energy curve generally goes through a maximum, after which mixing can be continued somewhat longer to improve the processability of the blend. If desired, one can add some of the ingredients (e.g. oil or additional oil) after the dynamic vulcanization is complete. After discharge from the mixer, the blend containing vulcanized rubbery polymer and the semicrystalline polyolefin (thermoplastic) can be milled, chopped, extruded, pelletized, injection molded, or processed by any other desirable technique.

It is usually desirable to allow the fillers and a portion of any plasticizer to distribute themselves in the rubber or semicrystalline polyolefin phase before the rubbery polymer phase is crosslinked. Crosslinking (vulcanization) of the rubbery polymer can occur in a few minutes or less depending upon the mix temperature, shear rate, and activators present for the curative. Suitable curing temperatures include from about 120° C. when using a semicrystalline polyethylene phase or 175° C. when using a semicrystalline polypropylene phase to about 250° C. More preferably temperatures are from about 170° C. to about 200° C. or 225° C. These temperatures are controlled more by the processing temperature for the semicrystalline polyolefin than by the activation temperature for the curatives. Mixing equipment can include batch or continuous mixers such as Banbury™ mixers, Brabender™ mixers and certain mixing extruders.

The thermoplastic vulcanizate can, as noted above, include a variety of additives. The additives include particulate fillers such as carbon black, silica, titanium dioxide, colored pigments, clay, zinc oxide, stearic acid, stabilizers, antidegradants, flame retardants, processing aids, adhesives, tackifiers, plasticizers, wax, discontinuous fibers (such as wood cellulose fibers) and extender oils. When extender oil is used, it can be present in amounts from about 5 to about 300 parts by weight per 100 parts by weight of semicrystalline polyolefin and rubbery polymer. The amount of extender oil (e.g. paraffinic, aromatic and naphthenic oils and ester plasticizers) may also be expressed as from about 30 to about 250 parts and more desirably from about 70 to about 200 parts by weight per 100 parts by weight of said rubbery polymer. Oils can extend and soften the rubbery polymer phase (e.g. lower the Tg of the blend of rubbery polymer and oil as compared to the rubbery polymer alone). Oils may improve other properties of the blend (e.g. ultimate tensile strength) due to changing phase sizes of the rubbery polymer phase or plastic phase or changing the interactions of the rubbery polymer phase and the plastic phase at the interface. Oils can be aliphatic, aromatic, naphthenic oils, or ester plasticizer oils or blends thereof. Aromatic and naphthenic oils are generally preferred due to their compatibility with the repeat units from the norbornene type monomers. When non-black fillers are used, it is desirable to include a coupling agent to compatibilize the interface between the non-black fillers and the polymers. Desirable amounts of carbon black, when present, are from about 40 to about 250 parts by weight per 100 parts by weight of said rubbery polymer and from about 10 to about 100 parts by weight per 100 total parts by weight of the total of said rubbery polymer and said semicrystalline polyolefin.

The ester plasticizers desirably have number average molecular weights below 10,000 and more desirably below 2000 or 600. They are organic esters and alkyl ether esters. They can lower the Tg of the polyolefin and rubbery components, which can result in better properties below room temperature. It is important that the ester be compatible, or miscible, with both the polyolefin and rubbery components of the compositions, i.e. that it mix with the other components to form a single phase. The esters found to be most suitable were either aliphatic mono- or diesters or alternatively oligomeric aliphatic ester or alkyl ether esters. Polymeric aliphatic ester and aromatic esters were found to be significantly less effective, and phosphate esters were for the most part ineffective. U.S. Pat. No. 5,290,886 is incorporated by reference for its teachings on effective plasticizers and their usage.

Any conventional cure system for unsaturated rubbers to be dynamically vulcanized can be used in the dynamic vulcanization process. These include sulfur curatives as well as non-sulfur curatives. Sulfur curatives include sulfur and sulfur-based accelerators such as the guanidines, thiurams, thiocarbonates, mercaptobenzothiazols, benzothiazol disulfides, thiuram sulfides, zinc dialkyl dithiocarbamates, etc. The non-sulfur cure system includes peroxides, the various phenolic resins, and hydrosilylation. Examples of useful peroxides include the organic peroxides such as laurel peroxide, benzoyl peroxide, tertiary butyl peroctoate, tertiary butyl perbenzoate, dicumyl peroxide, 2,2'-bis(tert-butyl peroxy)diisopropylbenzene, 2,5-dimethyl,2,5-di(tert-butyl peroxy)hexane and axo compounds such as azobisisobutylnitrile, and the like. The peroxide-based cure systems may be used with or without co-agents such as sulfur, ethylene dimethacrylate, polyethylene glycol dimethacrylate, trimethylol propane, trimethacrylate, divinyl benzene, diallyl itaconate, triallyl cyanurate, diallyl phthalate, allyl methacrylate, cyclohexyl methacrylate, m-phenylene bis-maleimide, and the like. When peroxide-based cure systems are utilized it is often desirable to include co-agents capable of enhancing the cure state and inhibiting chain fragmentation or chain scission to other polymers. The other polymers to be protected include polypropylene. Examples of specific co-agents include maleimide compounds and bismaleimide compounds such as m-phenylene bismaleimide, (4,4'-m-phenylene bismaleimide), 4,4'-vinylenediphenyl bismaleimide, p-phenylene bismaleimide, 4,4'-sulfonyldilphenyl bismaleimide, 2,2'-dithiodiphenyl bismaleimide, 4,4'-ethylene-bis-oxyphenyl bismaleimide, 3,3'-dichloro-4,4'-biphenyl bismaleimide, o-phenylene bismaleimide, m-phenylene bismaleimide (HVA-2), hexamethylene bismaleimide and 3,6-durine bismaleimides. The maleimide and bismaleimide compounds will generally be used in an amount equal to about 0.1 to about 10 parts per hundred parts of rubber and it can be used with both peroxide and non-peroxide curing systems. Another useful co-agent to prevent chain fragmentation or scission effects of polypropylene and other polymers with tertiary carbon atoms is adding isobutylene polymers. Desirable amounts of isobutylene polymers range from about 5 to about 20 parts by weight per 100 parts by weight of polyolefin resin. Suppression of chain fragmentation and scission effects can also be achieved by delaying the introduction of some of the portion of the polyolefin resin, generally less than about one half of the total amount of polyolefin resin used. To best avoid excessive crosslinking or degradation of the polyolefin resin, it will comprise a significant portion of a polypropylene homo- or copolymer. By "significant portion" it is meant that at least 12 weight percent polypropylene based upon the total weight of resin plus rubber present. Thus, where a peroxide cure system is utilized, the polyolefin resin will preferably be polypropylene or a mix of polypropylene and other olefin-based resins. Hydrosilylation cure systems are taught in U.S. Pat. Nos. 4,803,244 and 5,672,660 hereby incorporated by reference for their teaching thereon.

When the rubbery polymer includes large proportions by weight of norbornene type monomers, a compatibilizer for the semicrystalline polyolefin and the rubbery polymer will improve the properties of thermoplastic vulcanizate. Functionally, a compatibilizer increases the positive interactions between the semicrystalline polyolefin and the rubbery polymer reducing the phase size of the dispersed phase. It may reside in the semicrystalline polyolefin phase, rubbery polymer phase, or at the interface between the phases or combinations thereof. Preferred compatibilizers are copolymers of two or more monoolefins having from 2 to 20 carbon atoms, preferably 2 to 8 carbon atoms, or other polymers having structural similarities to said copolymers. Ethylene-α-olefin copolymers such as ethylene propylene rubber (EPR) or ethylene propylene diene rubber (EPDM) are preferred compatibilizers. These copolymers due to the randomness of incorporation of the different repeat units will have little or no crystallinity. Other polymers with similar structures to EPR or EPDM can also function as compatibilizers. Examples of such other polymers with strucutures similar to EPR or EPDM rubber include hydrogenated polyisoprene and hydrogenated blocky copolymers of conjugated dienes having from about 4 to about 12 carbon atoms, such as hydrogenated copolymers of conjugated dienes and vinyl aromatic monomers having from about 8 to about 12 carbon atoms. Hydrogenated blocks of isoprene have the same structure as copolymers of alternating propylene and ethylene repeat units. Hydrogenated blocks of butadiene have the structure of a copolymer of ethylene and 1,2-butene. Examples of said polymers include hydrogenated styrene-butadiene (SEBS) and other conjugated diene-vinyl aromatic copolymers (SEPS) sold under the trademark Kraton™.

The compatibilizers that are copolymers of two or more monoolefins differ from the semicrystalline polyolefins in that they have much lower crystallinity. Typically a compatibilizer for this specification has from about 0 to about 15 or 18 weight percent crystallinity and more desirably from about 0, 1, or 2 to about 10 weight percent crystallinity as determined by dynamic scanning calorimetry. The olefin copolymers can be polymerized with single site catalysts (e.g. metallocene type) which can result in very random incorporation of repeat units from the two or more different monomers and consequently little crystallinity. U.S. Pat. Nos. 5,057,475 and 5,153,157 are incorporated by reference for their teachings regarding these polymerizations. The copolymers of two or more monoolefins desirably have from about 75 to about 92 or 95 mole percent of repeat units from a first monoolefin and from about 5 or 8 to about 25 mole percent of a second monoolefin. The EPDM terpolymers desirably have from about 50 to about 79 mole percent of repeat units from a first monoolefin from about 20 to about 49 mole percent of repeat units from a second different monoolefin and from about 1 or 2 to about 5 or 10 mole percent repeat units from a nonconjugated diene or other nonconjugated polyene having from 5 to 20 carbon atoms.

The compatibilizers vary from the rubbery polymer in that they do not include the repeat units from monounsaturated norbornene type monomers in the amounts which characterize the particular rubbery polymers of this disclosure.

Generally the compatibilizers will function upon blending to reduce the volume average domain size of the dispersed phase or reduce the cross-sectional area of a domain in an interpenetrating blend, or increase the modulus or increase the tensile strength of the blend of said semicrystalline polyolefin in said rubbery polymer. They can achieve this by modifying the semicrystalline polyolefin phase or modifying the rubbery polymer phase so that they become more compatible or by modifying the interface between the two phases, such that it is easier to interdisperse the two phases when preparing the thermoplastic vulcanizate. It has been observed that a crosslinkable compatibilizer such as EPDM generally will result in lower compression set than a non-crosslinkable EPR in the resulting thermoplastic vulcanizate, if other factors affecting compression set in the thermoplastic vulcanizate are otherwise controlled.

Polymer blends and thermoplastic vulcanizate compositions of the invention are useful for making a variety of articles such as tires, hoses, belts, gaskets, moldings, and molded parts. They are particularly useful for making articles by extrusion, injection molding, blow molding, and compression molding techniques. They are also useful for modifying thermoplastic resins, in particular polyolefin resins. The compositions can be blended with thermoplastic resins using conventional mixing equipment making a rubber-modified thermoplastic resin. The properties of the modified thermoplastic resin depend upon the amount of thermoplastic vulcanizate composition added.

Stress/strain properties of the compositions are determined in accordance with the test procedures as set forth in ASTM D-412 and oil swell is determined by ASTM D-471. These stress/strain properties include tension set (TS), ultimate tensile strength (UTS), 100 percent modulus (M100), and ultimate elongation at break (UE). Especially preferred compositions of the invention are rubbery compositions having tension set values of about 15 percent or less and oil swell values of 120 percent or less.

EXAMPLES

The following tables illustrate how the thermoplastic vulcanizates of the invention can be prepared including the addition of compatibilizers. The physical properties of the thermoplastic vulcanizates can be modified or adjusted by changing the mix procedures, compositions, and other variables in their preparation. The designation of the rubbery polymer formula by $C_2$-NB-ENB or $C_2$-$C_3$-NB-ENB will be used and designates an ethylene-norbornene-ethylidene norbornene terpolymer or an ethylene-propylene-norbornene-ethylidene norbornene tetrapolymer, respectively. Normally the ratios of the three monomers in the feed are given in a heading or in a footnote for each table. Some unvulcanized compositions are shown to illustrate the effect of vulcanization on polymer compatibility and on physical properties of the vulcanizates. In particular, the dispersion of the semicrystalline polyolefin with the rubbery polymer is generally improved by dynamic vulcanization.

A 7.5 liter pressurized glass reactor, equipped with a thermocouple and a mechanical stirrer and cooled by an external jacketed recirculating ethylene glycol/water bath was purged for several hours with nitrogen. It was partly filled with 3 L of dry, deoxygenated toluene and cooled to 25° C. The solution was agitated at approximately 150 rpm and a solution of a mixture of 15 g of norbornene and 1 mL of tetraethoxy silane was added to the vessel along with 45 mL of a 25% solution of ethyl aluminum sesquichloride in hexane. Ethylene was purged into the vessel at the rate of 100 g per hour. Approximately seven minutes after the addition of ethylene was started the flow of two solutions was initiated. The first solution was a dilute solution of vanadium tetrachloride (1 mL/6400 mL of hexane) in hexane added at the rate of 12.5 mL/min. The second solution was a mixture of 215 g of norbornene, 40 mL of 5-ethylidene-2-norbornene and 1 mL of tetraethoxy silane in 1600 mL of hexane. This hexane soution was added at the rate of 12.5 mL/min. This corresponds to the addition of 101 g of norbornene per hour. A rapid polymerization ensued evident from slowly increasing viscosity of the solution. The temperature was maintained in the range of 15 to 20° C. with the refrigerated external bath. The flow of ethylene, propylene, vanadium chloride solution and mixed norbornene, 5-ethylidene-2-norbornene and 1 mL of tetraethoxy silane solution were monitored every two minutes during the polymerization. Adjustments were made to the flow of the reactants and the refrigeration bath to maintain the reaction conditions for 2 hours.

At the end of the reaction period the polymerization reaction was terminated by stopping the flow of all reactants. Stirring was continued and the polymerization was quenched by addition of 20 mL of tetraethoxy silane followed by 100 mL of hot water. After several minutes the hydrolysis of the reaction residues was complete and the clear solution of the polymer was deashed with slightly acid water, maintained at pH 1 to 2, rewashed with water and precipitated in an excess of isopropanol. The precipitated polymer was removed by filtration and treated with 300 ppm of Irganox-1076 and dried at 80° C. to yield 468 g of a copolymer of ethylene, 5-ethylidene-2-norbornene and norbornene with Tg of 18.3° C. by DSC.

In a similar manner polymers were made by changing the amount of norbornene added to 80 g/hr, 90 g/hr, 110 g/hr and 130 g/hr. For each of the polymerization the addition of other reactants was left unchanged. In each case a terpolymer of ethylene, norbornene, and ethylidene-norbornene was obtained. The analysis of these polymers is shown below. The norbornene content was determined according to the 13 C NMR procedure in J. Appl. Polymer Sci. vol. 163 pp 1071–1076 (1997).

TABLE 1

Ethylene/norbornene/ethylidene norbornene copolymers

| Exp # | Norbornene added Gm/hr | C2 mol % | NB mol % | ENB mol % | Mn (by GPC) | MWD (by GPC) |
|---|---|---|---|---|---|---|
| 1 | 101 | 77.2 | 19.8 | 2.46 | 89300 | 2.8 |
| 2 | 80 | 84 | 13.5 | 2.50 | 92300 | 2.6 |
| 3 | 90 | 80.9 | 16.8 | 2.33 | 77800 | 2.9 |
| 4 | 110 | 74.8 | 22.7 | 2.35 | 77200 | 3.5 |
| 5 | 130 | 70 | 28 | 2 | 71000 | 3.7 |

Table II shows numerous examples of both polymer blends and thermoplastic vulcanizates made from thermoplastic polypropylene blended with a rubbery polymer. Table II shows the effect of paraffinic and naphthenic oils, vulcanization and compatibilizers on a blend of polypropylene and the rubbery polymer. The rubbery polymer in Table II has about 28 mole % norbornene based repeating units and particularly benefits from the compatibilizer and naphthenic oil. A comparison of Example D23, which is plasticized with paraffinic oil, and D22, which is not plasticized, shows a reduction in the Shore D hardness and a reduction in the ultimate tensile strength. A comparison of Example D24 with Examples D22 and D23 shows the addition of a naphthenic oil (D24) resulted in less decrease in the physical properties than addition of paraffinic oil (D23) with a similar change in the Shore D hardness. It should also be noted that Examples D23 and D24 show a dramatic change in the elongation at break achieved by adding oil to the composition of Example D22. The comparison of Example D25 to Example D22 shows little effect from the inclusion of zinc oxide and stannous chloride. The comparison of Example D26 to Example D23 shows that dynamic vulcanization did not change the Shore D or tensile properties very much, but did significantly reduce oil swell and compression set. A comparison of Example D27 to D26 and D23 shows a slightly harder composition results from the use of naphthenic oil than paraffin oil. The comparison of Example D28 to Example D27 shows that the addition of the naphthenic oil in two increments, one before vulcanization and one after vulcanization only resulted in a slightly softer composition. A comparison of Example D29 to Example D27 shows that the crosslinkable compatibilizer (EPDM) resulted in a softer composition with better elongation at break and much lower compression set. A comparison of Example D30 to Examples D29 and D27 shows that the ethylene-propylene rubber may be a better compatibilizer than the EPDM rubber since it showed slightly higher elongation. However, as expected, the ethylene-propylene rubber in Example D30 resulted in a thermoplastic vulcanizate with slightly higher compression set and oil swell than did the EPDM rubber in Example D29.

The weight average diameter of the dispersed phase (rubber) was evaluated with electron microscopy. The average diameter of the rubber phase in D22 without polymeric compatibilizer was greater than or equal to 100 microns. The average diameter of the rubber phase in D25, which included curatives, was reducted to greater than or equal to 50 microns. In D29, which included a polymeric compatabilizer, the average diameter of the rubber phase was reduced to less than or equal to about 2 microns. It is desirable for the polymeric compatabilizer to reduce the weight average diameter of the dispersed phase to less than about 25 microns.

TABLE II

Evaluation of Blend Including $C_2$-NB-ENB With Polypropylene (28 Mole Percent of NB)

| Examples | D22 | D23 | D24 | D25 | D26 | D27 | D28 | D29 | D30 |
|---|---|---|---|---|---|---|---|---|---|
| $C_2$-NR-ENB[1] | 100 | 100 | 100 | 100 | 100 | 100 | 100 | 80 | 80 |
| Polypropylene | 66.7 | 66.7 | 66.7 | 66.7 | 66.9 | 66.9 | 66.7 | 66.7 | 66.7 |
| Keltan ™ 1446A (EPDM) | — | — | — | — | — | — | — | 20 | — |
| EPR 9 weight % Ethylene | — | — | — | — | — | — | — | — | 20 |
| Zinc oxide | — | — | — | 2.0 | 2.0 | 2.0 | 2.0 | 2.0 | 2.0 |
| $SnCl_2$ | — | — | — | 2.0 | 2.0 | 2.0 | 2.0 | 2.0 | 2.0 |
| Sunpar ™ -150 (paraffinic oil) | — | 38.7 | — | — | 38.7 | — | — | — | — |
| Tuflo ™ -200 (naphthenic oil) | — | — | 38.7 | — | — | 38.7 | 14.3 | 38.7 | 38.7 |
| SP-1045 (phenolic resin) | | | | 5.5 | 5.5 | 5.5 | 5.5 | 5.5 | 5.5 |
| Additional Ingredients Added Two Minutes After Curing | | | | | | | | | |
| Tuflo ™ 2000 | — | — | — | — | — | — | 24.4 | — | — |
| Physical Properties | | | | | | | | | |
| Hardness Shore A/D | 77(D) | 47(D) | 50(D) | 75(D) | 49(D) | 56(D) | 52(D) | 92(A) 48(D) | 94(A) 51(D) |
| Ultimate Tensile Strength MPa | 38.3 | 16.4 | 27.0 | 29.6 | 15.8 | 17.4 | 13.4 | 21.9 | 22.2 |
| Elongation at Break | 11 | 334 | 428 | 5 | 274 | 297 | 197 | 367 | 406 |
| 100% Modulus MPa | — | 9.0 | 10.2 | — | 10.1 | 11.8 | 11.7 | 10.2 | 11.0 |
| Tension Set, % | — | 43.2 | 46.2 | — | 41.7 | 58.8 | — | 44.2 | 53.3 |
| Compression Set, % 22 hr @ 100° C. | 93.4 | 95.1 | 95.9 | — | 71.2 | 75.2 | 72.2 | 45.3 | 59.8 |
| Oil Swell, % 3 days @ 125° C. | dissolved | dissolved | dissolved | — | 98.6 | 105.1 | 103 | 98.5 | 118 |

TABLE II-continued

Evaluation of Blend Including C$_2$-NB-ENB With Polypropylene (28 Mole Percent of NB)

|  | C$_2$— | NB | ENB |
|---|---|---|---|
| Feed g/hr | 95.00 | 130.00 | 10.00 |
| Moles | 3.39 | 1.37 | 0.08 |
| Mole % | 70.00 | 28.00 | 2.00 |

Table III shows blends of polypropylene with one or two rubbery polymers having repeat units from norbornene. Example F35 is a simple blend of polypropylene and a rubbery polymer. Example F36 can be compared to Example F35 and shows that the blend still has low ultimate elongation. Example F37 can be compared with the previous "F" examples and shows that the addition of 50 parts of paraffinic oil dramatically increases the elongation at break, and softens the composition somewhat. Example F38, when compared to Example F37, shows that a blend of two rubbery polymers containing repeat units from norbornene can have significantly higher tensile strength and ultimate elongation than a similar composition with only a single rubbery polymer containing repeat units from a norbornene monomer. Example F39, when compared to Examples F37 and F38, shows the addition of a compatabilizing polymer (EPDM) can impart significant improvements in the Shore A softness of the composition, the tnesile strength of the composition, and the ultimate elongation of the composition when compared to a similar blend (F37) without a compatibilizer and shows comparable properties to F38 containing a compartibilizer that is itself a rubbery polymer containing repeat units from norbornene. Example F42 shows that a compatibilizer (ethylene-propylene rubber) imparts significant improvements in tensile strength and elongation at break over Example F37 that had no compatibilizer. Example F42 has similar properties to Example F38, which used the previously preferred compatibilizer EPDM rubber.

TABLE III

Evaluation of C$_2$-NB-ENB Blends With Polypropylene and Optionally a Compatibilizer

| Example | F35 | F36 | F37 | F38 | F39 | F42 |
|---|---|---|---|---|---|---|
| C$_2$-NB-ENB[1] | 100 | 100 | 100 | 80 | 80 | 80 |
| C$_2$C$_3$-NB-ENB[2] | — | — | — | 20 | — | — |
| Keltan ™ 1446A (EPDM) | — | — | — | — | 20 | — |
| EPR (9 weight % ethylene) | — | — | — | — | — | 20 |
| PP | 66.7 | 66.7 | 66.7 | 66.7 | 66.7 | 66.7 |
| Sunpar ™ 150 (paraffinic oil) | — | — | 50 | 50 | 50 | 50 |
| Zinc oxide | — | 2.0 | 2.0 | 2.0 | 2.0 | 2.0 |
| SnCl$_2$—H$_2$O | — | 2.0 | 2.0 | 2.0 | 2.0 | 2.0 |
| SP-1045 (phenolic resin) | — | 5.5 | 5.5 | 5.5 | 5.5 | 5.5 |
| Physical Properties | | | | | | |
| Hardness Shore A/D | 67(D) | 67(D) | 45(D) | 42(D) | 91(A) | 86(A) |
| Tensile Strenth, MPa | 36.2 | 32.8 | 11.9 | 16.2 | 15.7 | 18.3 |
| Ultimate Elongation % | 8 | 1 | 205 | 300 | 250 | 350 |
| 100% Modulus Mpa | — | — | 10.6 | 8.8 | 9.2 | 9.1 |

|  | C$_2$ | C$_3$ | NB | ENB |
|---|---|---|---|---|
| [1]Reactor Feed Rate | 100 | — | 110 | 10 (g/hr) |
| [1]Reactor Feed Rate | 100 | 45 | 110 | 10 (g/hr) (containes about 12 mole % NB) |

Table IV shows the evaluation of various blends of polypropylene with a rubbery polymer containing repeat units from a norbornene monomer. Other rubbery polymers containing repeat units from a norbornene are also included along with compatabilizers and extender oils. Example G43 is an oil-extended blend of polypropylene and a rubbery polymer. Example G44 can be compared to G43 and shows the effect of a second rubbery polymer containing repeat units from norbornene that increases the ultimate elongation at break. Example G45 can be compared to Example G44 or G43 and shows the effect of adding Keltan™, EPDM, as compatibilizer of the blend. Example G46 uses the same compatibilizer with dynamic vulcanization as used in Example G45 and shows tensile properties comparable to nonvulcanized blends and superior tension set/compression set and oil swell than the nonvulcanized blends. Compatibility was achieved by the vulcanization process. Example G47 shows the use of two rubbery polymers containing repeat units from norbornene monomers does not automatically impart compatibility to the blend. Example G48 shows the dynamic vulcanization product from a blend comprising polypropylene, two rubbery polymers containing repeat units from norbornene monomers and paraffinic oil results in compatibility and desirable properties. Example G49 can be compared to Example G47 and shows that a potential compatibilizer (Kraton™ G) did not impart compatibility and did not result in substantially better properties than G47. Example G52 shows similar result where a compatibilizer of ethylene-propylene rubber did not result in a significant improvement of the physical properties, other than a reduction of the hardness from a Shore D of 43 on Example G43 to a Shore A of 88 on Example G52. Example G53 showed that dynamic vulcanization of a blend of G52 resulted in an increase in properties, specifically improvement in the 100 percent modulus and improvement in the tensile strength and improvements in the oil swell, compression set and tension set. The above Examples illustrate a variety of formulation techniques to modify the Shore A and Shore D hardness, the tensile properties, tension set, compression set and oil swelling of dynamic vulcanizates from a norbornene monomer. Depending upon the norbornene content of the rubbery polymer, the compatibilizer may or may not show a significant effect on the physical properties of the blend. Generally, vulcanization does significantly impact both the compatibility of the blend, as visually determined, and as determined by a comparison of the physical properties of the resulting compositions. In some embodiments, the addition of an extender oil (either paraffinic or naphthenic or combinations thereof) resulted in a significant increase in compatibility and in a softer thermoplastic vulcanizate with more desirable physical properties.

TABLE IV

Evaluation of C₂-NB-ENB Blends With Polypropylene and Compatibilizers

| Example | G43 | G44 | G45 | G46 | G47 | G48 | G49 | G52 | G53 |
|---|---|---|---|---|---|---|---|---|---|
| $C_2$-NB-ENB[1] | 100 | 80 | 80 | 80 | 50 | 50 | 80 | 80 | 80 |
| $C_2C_3$-NB-ENB[2] | — | 20 | — | — | 50 | 50 | — | — | — |
| Keltan ™ 1446A (EPDM) | — | — | 20 | 20 | — | — | — | — | — |
| Kraton ™ G (styrene-butadiene block copolymer) | — | — | — | — | — | — | 20 | — | — |
| EPR (9 weight % ethylene) | — | — | — | — | — | — | — | 20 | 20 |
| Polypropylene | 66.9 | 66.9 | 66.9 | 66.9 | 66.9 | 66.9 | 66.9 | 66.9 | 66.9 |
| Sunpar ™ 150 (paraffinic oil) | 50 | 50 | 50 | 50 | 50 | 50 | 50 | 50 | 50 |
| Zinc oxide | — | — | — | 2 | — | 2 | — | — | 2 |
| $SnCl_2$—$H_2O$ | — | — | — | 2 | — | 2 | — | — | 2 |
| SP-1045 (phenolic resin) | — | — | — | 5.5 | — | 5.5 | — | — | 5.5 |
| Physical Properties | | | | | | | | | |
| Compatibility | No | No | Much Improved | Yes | No | Much Improved | No | No | Yes |
| 100% Modulus Mpa | 9.3 | 7.5 | 4.4 | 9.2 | 7.3 | 8.0 | 7.0 | 8.5 | 9.1 |
| Hardness Shore A/D | 43D | 40D | 86A | 91A | 91A | 89A | 39D | 88A | 87A |
| Tensile Strength, Mpa | 15.5 | 15.6 | 6.5 | 15.7 | 11.7 | 20.4 | 9.1 | 14.3 | 18.3 |
| Ultimate Elongation % | 280 | 355 | 115 | 248 | 332 | 364 | 250 | 337.8 | 346.7 |
| Tension Set, % | 53 | 52 | 43.2 | 30.7 | 49.3 | 32.2 | 49 | 41.2 | 33.7 |
| Compression Set, % 22 hr @ 100° C. | 88.7 | 90.2 | 92.8 | 57.4 | 98.2 | 62.5 | 91.9 | 86.18 | 60.5 |
| Oil Swell, % 3 days @ 125° C. | Dissolved | Dissolved | Dissolved | 88.9 | Dissolved | 100.6 | Dissolved | Dissolved | 104 |

| | $C_2$ | $C_3$ | NB | ENB |
|---|---|---|---|---|
| [1]Reactor Feed Rate | 100 | — | 110 | 10 (g/hr) |
| [1]Reactor Feed Rate | 100 | 45 | 110 | 10 (g/hr) (containes about 12 mole % NB) |

TABLE V

Evaluation of C2-NB-ENB Blends With Polypropylene and Compatibilizer

| Sample | 1 | 2 | 3 | 4 | 5 | 6 | 7 |
|---|---|---|---|---|---|---|---|
| $C_2$-$C_3$-NB-ENB | 100 | 100 | 100 | 100 | 80 | 80 | 100 |
| EPR 11.6% ethylene | — | — | — | — | — | 20 | — |
| EPDM | — | — | 20 | — | 20 | — | — |
| Polypropylene | 66.8 | 66.7 | 66.7 | 66.7 | 66.7 | 66.7 | 66.8 |
| Isooctyl phthalate | — | 50 | 50 | 50 | 50 | 50 | — |
| ZnO | — | — | — | 2 | 2 | 2 | 2 |
| $SnCl_2$ $2H_2O$ | — | — | — | 2 | 2 | 2 | 2 |
| SP 1045 | — | — | — | 5.6 | 5.6 | 5.6 | 5.5 |
| Physical Properties | | | | | | | |
| Hardness | 67D | 71A | 83A | 84A | 80A | 84A | 68D |
| Tens. Strength Mpa | 25.4 | 6.9 | 4.8 | 15.8 | 15.1 | 15.9 | 28.7 |
| Elong % | 484 | 387 | 153 | 413 | 323 | 362 | 402 |
| 100% Modulus Mpa | 18.0 | 5.5 | 4.6 | 5.7 | 6.4 | 6.3 | 21.4 |
| Comp. Set, 22 hrs 100° C. | 97.3 | 87.2 | 83.5 | 44.3 | 40.9 | 43.6 | 56.8 |
| Tens Set | Broke | 59.8 | 61.8 | 19.1 | 16.6 | 19.6 | Broke |

The $C_2C_3$-NB are 62, 14 and 24 mole % ENB is 4% by wt.
The EPR is a random copolymer is available from Exxon.
The EPDM is Keltan 1446 available from Copolymer DSM.
Tension set is measured after holding the sample in tension for 10 minutes at room temperature and then allowing the sample to relax 10 minutes at room temperature.

The $C_2C_3$-NB are 62, 14 and 24 mole % ENB is 4% by wt.
The EPR is a random copolymer is available from Exxon.
The EPDM is Keltan 1446 available from Copolymer DSM.

Tension set is measured after holding the sample in tension for 10 minutes at room temperature and then allowing the sample to relax 10 minutes at room temperature.

Table V and VI show additional embodiments of the invention including crosslinked and non-crosslinked controls, the use of an ester plasticizer (isooctyl phthalate) and the use of two different EPDM compatabilizers.

TABLE VI

Evaluation of C₂-NB-ENB Blends With Polypropylene and Compatibilizer

| | | | |
|---|---|---|---|
| $C_2$-$C_3$-NB-ENB | 80 | 80 | 80 |
| EPR 11.6% Ethylene | 20 | 20 | — |
| EPDM 223B | — | — | 20 |
| Ester Plasticizer | 50 | 50 | 50 |
| ZnO | — | 2.0 | 2.0 |
| $SnCl_2$ $2H_2O$ | — | 2.0 | 2.0 |
| SP 1045 | — | 5.6 | 5.6 |
| Physical Properties | | | |
| Hardness | 85A | 83A | 85A |
| UTS Mpa | 8.4 | 15.6 | 15.1 |
| Elongation % | 545 | 459 | 437 |
| M-100 Mpa | 6.1 | 5.7 | 6.0 |
| Comp Set, 22 hrs @ 100° C. | 90.9 | 65.5 | 45.8 |
| Oil Swell 72 hrs @ 125° C. | Dissolved | 130.7 | 112.8 |
| Tension Set | 53.8 | 21.6 | — |

The $C_2C_3$-NB are 62, 14 and 24 mole % ENB is 4% by wt.
The EPR is 11.6% ethylene and a random copolymer
The EPDM is 12.5% ethylene, 87.85% propylene and 4% ethylidene norbornene based upon 100 parts by weight ethylene and propylene.

While in accordance with the patent statutes the best mode and preferred embodiment has been set forth, the scope of the invention is not limited thereto, but rather by the scope of the attached claims.

What is claimed is:
1. A thermoplastic vulcanizate comprising,
 a) a semicrystalline poly-α-olefin thermoplastic resin, b) a rubbery polymer comprising from about 62 to about 92 mole percent of repeat units from at least one α-olefin having from 2 to 6 carbon atoms; from about 8 to about 28 mole percent repeat units from at least one norbornene having the formula

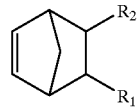

where $R^1$ and $R^2$ independently are a hydrogen or an alkyl of from 1 to 8 carbon atoms; and from about 0.1 to about 10 mole percent repeat units from a diene or a polyene having from 5 to 20 carbon atoms, and c) a polymeric compatibilizer for said semicrystalline poly (α-olefin) thermoplastic resin and said rubbery polymer, wherein said thermoplastic resin and said rubbery polymer are interspersed as a multiple phase blend and said compatibilizer reduces the weight average particle diameter of the dispersed phase to less than 25 microns.

2. A blend according to claim 1, wherein said rubbery polymer is partially or fully crosslinked.

3. A blend according to claim 1, wherein said semicrystalline poly(α-olefin) thermoplastic resin is from about 10 to about 85 parts by weight based upon 100 parts by weight of said polymer blend of poly(α-olefin) thermoplastic resin, rubbery polymer, and polymeric compatibilizer.

4. A blend according to claim 2, wherein said semicrystalline poly(α-olefin) thermoplastic resin is from about 15 to about 75 parts by weight based upon 100 parts by weight of said polymer blend of poly (α-olefin) thermoplastic resin, rubbery polymer, and polymeric compatibilizer.

5. A blend according to claim 3, wherein said semicrystalline poly(α-olefin) thermoplastic resin has at least 20 weight percent crystallinity as determined by dynamic scanning calorimetry and said polymeric compatibilizer has less than 15 weight percent crystallinity.

6. A blend according to claim 4, wherein said semicrystalline poly(α-olefin) thermoplastic resin has at least 30 weight percent crystallinity and said polymeric compatibilizer has less than 10 weight percent crystallinity.

7. A blend according to claim 3, further comprising from about 30 to about 250 parts by weight of oil per 100 parts by weight of said rubbery polymer.

8. A blend according to claim 4, further comprising from about 70 to about 200 parts by weight of oil per 100 parts by weight of said rubbery polymer.

9. A blend according to claim 3, wherein the crosslinks of said partially or fully crosslinked rubbery polymer are derived from a phenolic resin curative.

10. A blend according to claim 4, wherein the crosslinks of said partially or fully crosslinked rubbery polymer are derived from a phenolic resin curative.

11. A blend according to claim 4, wherein the polymeric compatibilizer comprises a polymer from at least ethylene, and a second α-monoolefin.

12. A blend according to claim 4, wherein the polymeric compatibilizer comprises a polymer from at least ethylene, propylene, and a nonconjugated diene or other nonconjugated polyene.

13. A blend according to claim 4, wherein the compatibilizing polymer comprises a hydrogenated blocky copolymer from at least a non-conjugated diene.

14. A blend according to claim 12, wherein the crosslinks of said partially or fully crosslinked rubbery polymer are derived from a phenolic resin curative.

15. A blend according to claim 13, wherein the crosslinks of said partially or fully crosslinked rubbery polymer are derived from a phenolic resin curative.

* * * * *